Figure 1:
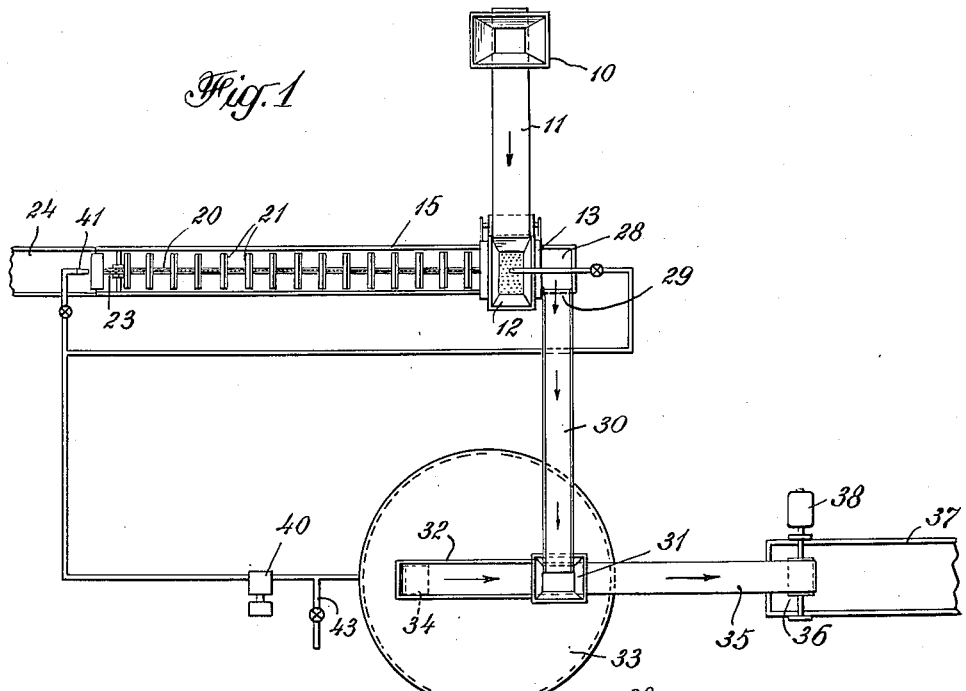

March 20, 1951     S. G. HARRIS ET AL     2,545,517
APPARATUS FOR THE RECOVERY OF CRAB MEAT FROM
BONY MATERIAL BY GRAVITY LIQUID SEPARATION
Filed Feb. 27, 1946

INVENTORS
Sterling G. Harris
BY Raymond H. Carrington
Pennie Edmonds Morton Barrows
ATTORNEYS Patented Mar. 20, 1951

2,545,517

UNITED STATES PATENT OFFICE 2,545,517

APPARATUS FOR THE RECOVERY OF CRAB MEAT FROM BONY MATERIAL BY GRAVITY LIQUID SEPARATION

Sterling G. Harris and Raymond H. Carrington, Beaufort, S. C., assignors to The Blue Channel Corporation, Port Royal, S. C., a corporation of Maryland Application February 27, 1946, Serial No. 650,614

3 Claims. (Cl. 209—173)

This invention relates to the recovery of meat from crabs as a preliminary to canning or other modes of preservation and is concerned more particularly with a novel method by which meat may be rapidly and efficiently recovered from the bony material of crabs within which it is enclosed or to which it adheres. The new method may be employed in the treatment of whole crabs, the legs and claws of crabs, and the trimmed carcasses of crabs, from which the major part of the meat has previously been removed, and by its use, slow and laborious manual operations are eliminated and much meat, that now goes to waste because of the difficulty of recovering it, is saved. The practice of the method, accordingly, not only reduces the labor charges involved in the preparation of crab meat for the market but also lowers the cost of production because of the increased yield of meat that results from its use. In addition, the rapidity with which the meat may be recovered, when the method is used, reduces loss of flavor of the meat.

In addition to the method, the invention includes a novel apparatus, by which the method can be practiced to advantage. The new apparatus is of simple inexpensive construction and it can be operated by operators of little training or skill.

In carrying out the method of the invention, the bony crab material together with the meat enclosed therein or adhering thereto is first ground fine and the ground product is discharged into a tank containing water. Preferably, the ground product is washed out of the grinding apparatus, so that the wash water is added to that in the tank. At the bottom of the tank below the place where the ground material enters the water in the tank, there is an orifice which communicates with a vertical passage having an outlet at its upper end. Water from the tank, accordingly, flows through the orifice into the lower end of the passage and additional water is introduced into the lower end of the passage from an outside source. With this arrangement, the ground bony material drops to the bottom of the tank near the orifice and is removed and discharged, while the meat, which is somewhat buoyant, is entrained by the water flowing through the orifice and is carried up through the passage to be discharged at the outlet therefrom. Inedible material, such as the gills, viscera, etc. of ground whole crabs, floats at the surface of the water in the tank and can be skimmed off or otherwise removed.

Figure 2:
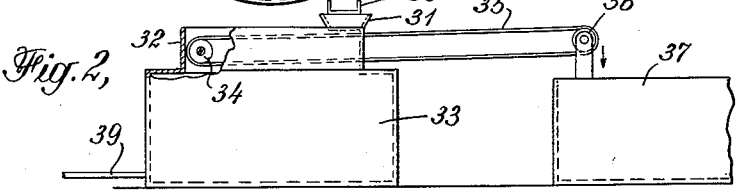
Figure 3:
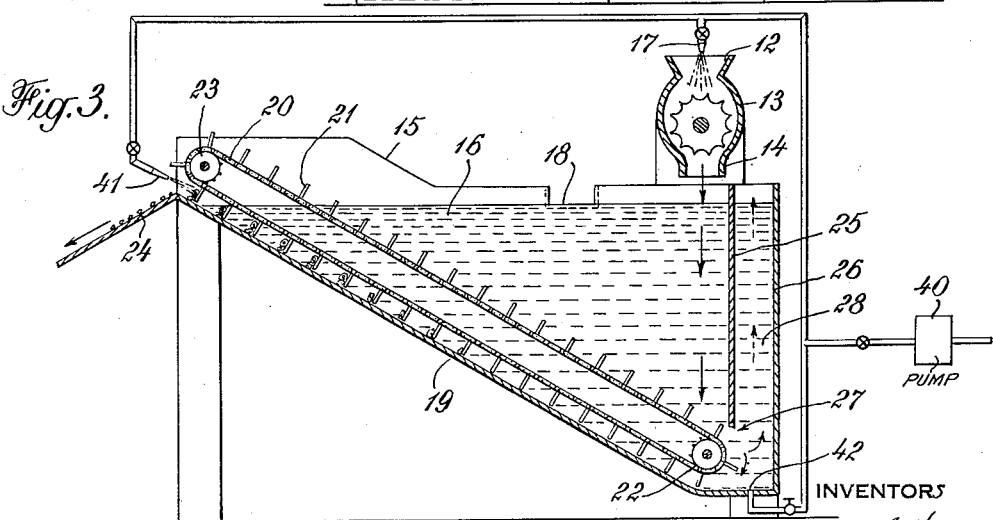

For a better understanding of the invention, reference may be made to the accompanying drawing, in which Fig. 1 is a plan view of one form of the apparatus of the invention;

Fig. 2 is a view in side elevation of a portion of the apparatus shown in Fig. 1; and Fig. 3 is a longitudinal vertical sectional view through one of the tanks in the apparatus of Fig. 1.

The apparatus illustrated in the drawings for the practice of the new method includes a hopper 10, into which the material to be treated is deposited for discharge upon a conveyor belt 11 leading to the inlet 12 of a grinder 13. The grinder may be of conventional construction and driven from any suitable source of power and the ground product therefrom is discharged through an outlet 14 into a tank 15 containing a body of water 16. Water is discharged into the grinder through the inlet 12 through a nozzle 17 and the wash water keeps the grinder clean and also continually adds to the quantity of water within the tank. One of the side walls of the tank is cut away at one side of the path of the ground product dropping from the grinder to provide an overflow 18.

The tank has an inclined bottom wall 19 leading upward from the end near which the ground material enters the tank, and a conveyor chain 20 having cross bars 21 is trained about sprocket wheels 22 and 23 lying at opposite ends of the inclined wall. The shaft of one of the sprocket wheels extends out of the tank and is driven from any convenient source of power and the sprocket wheels are so mounted and the conveyor so driven that the bars 21 travel upwardly along the inclined wall in close proximity to the surface of the latter. A discharge plate 24 mounted on the end wall of the tank leads downwardly from the upper end of the inclined wall thereof.

A vertical partition wall 25 is mounted between the side walls of the tank at the deep end thereof and extends downwardly from the top of the tank parallel to and spaced from the adjacent end wall 26 of the tank to terminate just above the path of the bars 21 on the conveyor. The partition and the side and bottom walls of the tank define an orifice 27, through which liquid from the tank may escape into a vertical passage 28 defined by the partition and the adjacent end and side walls of the tank. One of the side walls of the tank is cut away to form an outlet 29 from the passage and liquid discharged from the top of the passage flows through a slightly downwardly inclined trough 30 and into a hopper 31.

The hopper lies above and discharges into one end of a boxlike structure 32, which surrounds an opening in the top of a water tank 33. A pulley 34 is mounted on a shaft supported in bearings in the side walls of the box 32 at one end thereof, and a mesh belt 35 is trained about the pulley and passes through openings in the opposite end wall of the box. The belt is trained about a pulley 36 mounted on a shaft supported in suitable bearings above a receptacle 37. The shaft of one of the pulleys 34, 36 is driven from any suitable source of power, such as a motor 38 connected thereto. The side walls of the box 32 lie close to the edges of the belt 35, and the pulleys 34 and 36 are so mounted that the upper stretch of the belt travels in an upwardly inclined direction.

A pipe 39 leads from the tank 33 to the intake of a motor driven pump 40, the outlet of which is connected to a main line having branches, one of which leads to the nozzle 17. Another branch line leads to a nozzle 41, which discharges water upon material being carried along by the conveyor and just emerging from the water in tank 15. Another branch line supplied by the pump discharges through an inlet 42 into the bottom of the tank at the lower end of the passage 28. Make-up water required from time to time is supplied to the intake of the pump through a line 43 connected to any suitable source.

In the practice of the method by means of the apparatus described, the bony crab material, together with the meat enclosed therein or adhering thereto, is deposited in the hopper 10 and delivered by conveyor 11 to the grinder 13. The material to be treated may be either the legs and claws of crabs, the trimmed carcasses of crabs from which the inedible material and the major part of the meat have been removed by manual operations, or whole crabs. In the grinder, the material is ground to reduce it to particles varying in maximum dimensions from, for example, about $\frac{1}{32}''$ to about $\frac{1}{2}''$ with an average of about $\frac{1}{4}''$. The ground product is mixed with the wash water delivered from nozzle 17 and discharged into the tank at one side of partition 25 and above the deepest part of the tank. The inedible material, which is present when whole crabs are supplied to the grinder, floats on the surface of the water in the tank and may be skimmed off through the overflow 18, while the particles of bony material and meat sink downwardly through the water along one side of the partition 25. The sprocket wheel 22 of the conveyor lies within the tank close to orifice 27 and the particles of non-buoyant material fall from the feeding means through the liquid in the tank upon the upper stretch of the conveyor in the path of blades 21. The material is discharged from the upper stretch of the conveyor through the orifice into the effective range of the jet issuing from pipe 42 and the non-buoyant material that collects at the bottom of the tank at the orifice is picked up by the conveyor blades and advances along the inclined bottom wall 19 to be discharged upon the inclined plate 24, along which the material slides to be deposited in a suitable receptacle. Any meat adhering to the bony material being conveyed to the discharge plate is washed away by water from the nozzle 41 as the bony material emerges from the body of water in the tank.

The constant addition of water to the tank through the nozzles 17 and 41 causes a generally downward flow of the liquid in the tank toward the orifice 27 and an upward current in the passage 28, which is accelerated by the additional water introduced at 42. Although the particles of meat will not float in water, they are more buoyant than the particles of bony material, and, as the particles of meat approach the orifice in their descent through the water in the tank, they are entrained with the water passing through the orifice and are carried upwardly with the current flowing vertically through passage 28. The water with the particles of meat entrained therein, which is discharged into the trough 30, flows through the trough and into hopper 31 and from which it is delivered upon the upper surface of the belt 35 within the structure 32. The water tends to run down the slope of the belt and the latter is sufficiently pervious to permit the water to escape therethrough into tank 33. The particles of meat, however, are retained on the belt and carried away to be discharged into the receptacle 37. The water collects in tank 33 and is recirculated by pump 40.

In the practice of the method, the water used for washing the ground product from the grinder assists in creating a downward current along the inner face of partition 25 toward orifice 27 and the maintenance of this current is also promoted by the introduction of wash water through the nozzle 41 and the downward travel of the conveyor plates 21 on the upper stretch of the conveyor. As the direction of flow of the water throughout the tank is downwardly and toward the orifice, the particles of the bony material and meat discharged from the grinder tend to descend through the water in proximity to the inner face of the partition. At the orifice 27, a separation of the meat from the bony material takes place and the quality of the separation is determined to a considerable extent by the volume of water introduced through the inlet 42 at the lower end of passage 28. Thus, when a relatively small amount of water is introduced through the inlet, the lifting force of the current through passage 28 is sufficient to carry small particles of meat upwardly to the discharge 29, but a greater volume of water must be introduced through the inlet to cause larger particles of meat to be entrained and carried along by the current through the passage. However, if too much water is introduced, a lifting force will develop within the passage, which will be strong enough to carry particles of bony material upwardly with the meat. It is, therefore, necessary to adjust the amount of water introduced through the inlet in accordance with the fineness of the particles of meat being recovered, and such adjustment can be effected by means of a valve in the line leading to the inlet.

The new method provides a simple effective procedure for recovering meat from the bony material of crabs, with which it is associated, and the use of the method makes it possible to capture much crab meat that would otherwise be allowed to go to waste, because it is uneconomic to recover it by methods heretofore used. When whole crabs are treated, the manual operations of trimming the legs and claws, removing the carapace and gills, viscera, etc., and picking out the meat are wholly eliminated, and a three-way separation of bony material, meat, and inedible material is accomplished. When the material being treated consists of legs, claws, and picked carcasses of crabs, the bony material is separated from the meat and the meat recovered consists entirely of valuable material that would be wholly lost, if prior manual picking operations were employed.

We claim:

1. An apparatus for recovering meat contained within or adhering to the ground bony material of crabs, which comprises a tank containing a body of liquid and having a pair of opposed side walls and an end wall, a transverse vertical partition within the tank adjacent to and spaced from said end wall of the tank and with the latter partly defining a vertical passage, the partition stopping short of the bottom of the tank to form an orifice connecting the lower end of the passage with the remainder of the interior of the tank, means above the tank adjacent the partition and on the side thereof opposite to the passage for feeding the ground material into the liquid in the tank, means for introducing additional liquid under pressure into the lower end of the passage to create an upward current therein, an outlet in one side wall of the tank at a place remote from the passage for escape of liquid and buoyant material, means for leading from the top of the passage and away from the tank liquid and material, which is carried upwardly in said current, and a mechanical conveyor for removing non-buoyant material from the tank through the liquid therein, the conveyor having an upper stretch beneath the feeding means and receiving said material and discharging it through the orifice into the bottom of the passage in the path of the additional liquid introduced into the passage, the conveyor also having a lower stretch operating to advance the material from the bottom of the tank adjacent the orifice and discharge it from the tank at a place remote from the passage and on the same side thereof as the feeding means.

2. An apparatus for recovering meat contained within or adhering to the ground bony material of crabs, which comprises a tank containing a body of liquid and having a pair of opposed side walls and an end wall, a transverse vertical partition within the tank adjacent to and spaced from said end wall of the tank and with the latter partly defining a vertical passage, the partition stopping short of the bottom of the tank to form an orifice connecting the lower end of the passage with the remainder of the interior of the tank, means above the tank adjacent the partition and on the side thereof opposite to the passage for feeding the ground material into the liquid in the tank, means for introducing additional liquid under pressure into the lower end of the passage to create an upward current therein, an outlet in one side wall of the tank at a place remote from the passage for escape of liquid and buoyant material, means for leading from the top of the passage and away from the tank liquid and material, which is carried upwardly in said current, a mechanical conveyor for removing non-buoyant material from the tank through the liquid therein, the conveyor having an upper stretch beneath the feeding means and receiving said material and discharging it through the orifice into the bottom of the passage in the path of the additional liquid introduced into the passage, the conveyor also having a lower stretch operating to advance the material from the bottom of the tank adjacent the orifice and discharge it from the tank at a place remote from the passage and on the same side thereof as the feeding means, and means for washing the material about to be discharged from the tank by the mechanical means, the wash liquid entering the body of liquid in the tank.

3. An apparatus for recovering meat contained within or adhering to the ground bony material of crabs, which comprises a tank containing a body of liquid and having opposed side walls and a vertical end wall, the bottom of the tank being inclined upwardly in a direction away from said wall, a transverse vertical partition within the tank adjacent to and spaced inwardly from said end wall and with the latter partly defining a vertical passage, the partition stopping short of the bottom of the tank to form an orifice connecting the lower end of the passage with the remainder of the interior of the tank, means above the tank adjacent the partition and on the side thereof opposite to the passage for feeding the ground material into the liquid in the tank, means for introducing additional liquid under pressure into the lower end of the passage to create an upward current therein, an outlet on one side wall of the tank at a place remote from the passage for escape of liquid and buoyant material, means for leading from the top of the passage and away from the tank liquid and material, which is carried upwardly in said current, and a mechanical conveyor for removing non-buoyant material from the tank through the liquid therein, the conveyor having an upper stretch beneath the feeding means and receiving said material and discharging it through the orifice into the bottom of the passage in the path of the additional liquid introduced into the passage, the conveyor also having a lower stretch operating to advance the material from the bottom of the tank adjacent the orifice and discharge it from the tank at a place remote from the passage and on the same side thereof as the feeding means.

STERLING G. HARRIS.
RAYMOND H. CARRINGTON.

REFERENCES CITED

The following references are of record in the file of this patent:

UNITED STATES PATENTS

| Number | Name | Date |
|---|---|---|
| 965,706 | Greiner | July 26, 1910 |
| 1,828,760 | Blatch | Oct. 27, 1931 |
| 2,051,676 | Bloedorn | Aug. 18, 1936 |
| 2,337,188 | Geldermans et al. | Dec. 21, 1943 |
| 2,365,734 | Tromp | Dec. 26, 1944 |
| 2,422,657 | Cleveland | June 24, 1947 |

FOREIGN PATENTS

| Number | Country | Date |
|---|---|---|
| 60,650 | Denmark | Feb. 15, 1943 |
| 465,126 | Great Britain | Apr. 30, 1947 |